Feb. 8, 1938.   F. C. BEST   2,107,593
MOTOR VEHICLE
Original Filed March 6, 1933   2 Sheets-Sheet 1
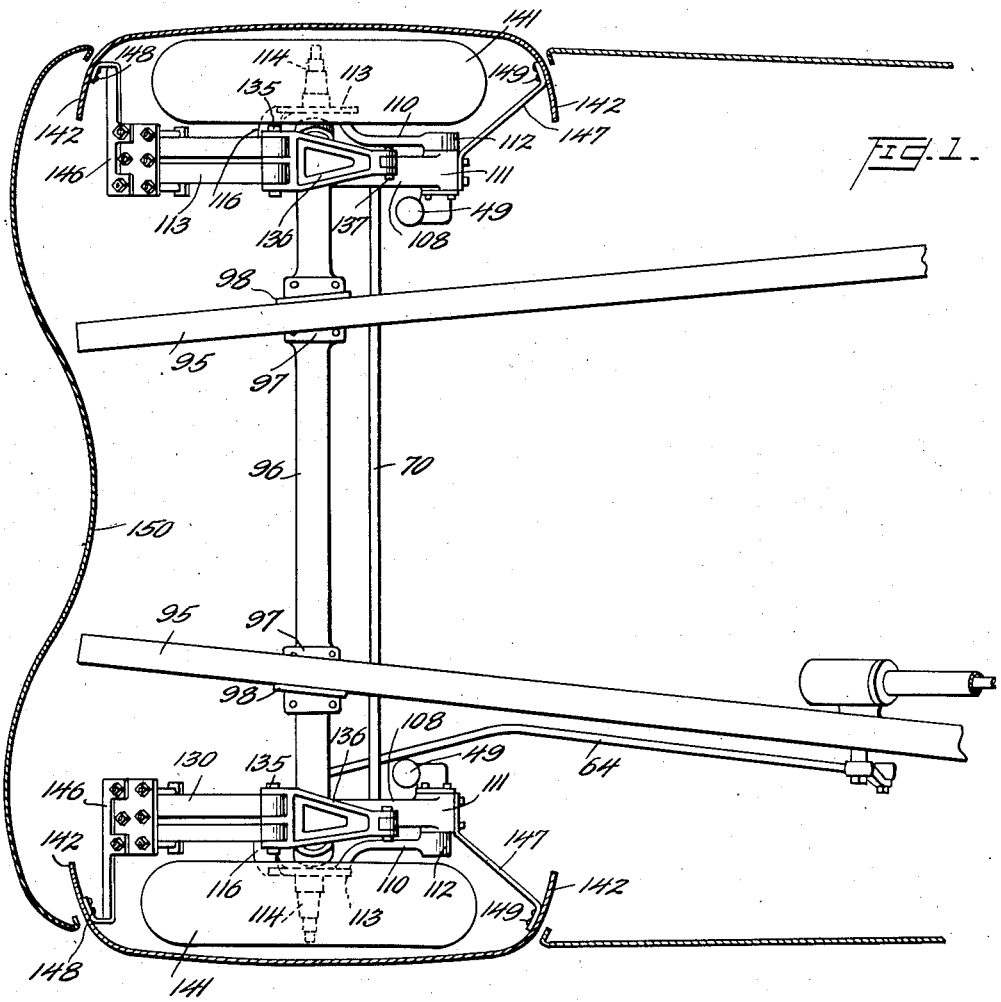

Feb. 8, 1938.   F. C. BEST   2,107,593
MOTOR VEHICLE
Original Filed March 6, 1933    2 Sheets-Sheet 2
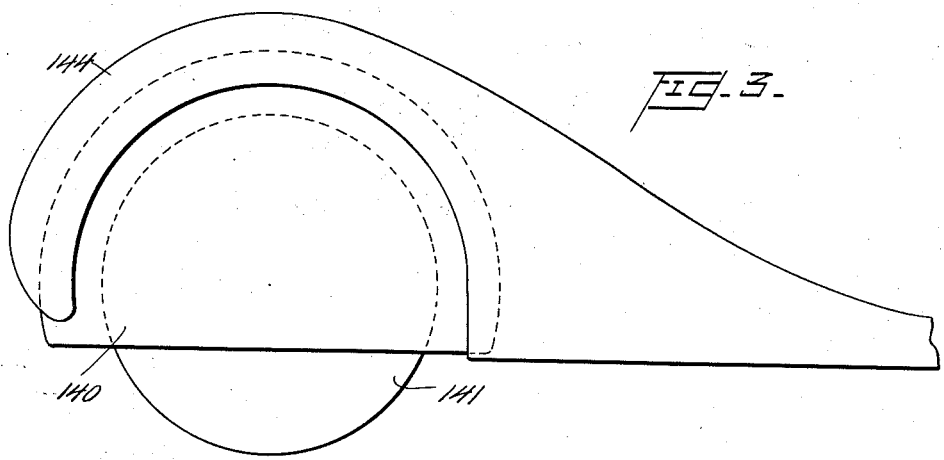
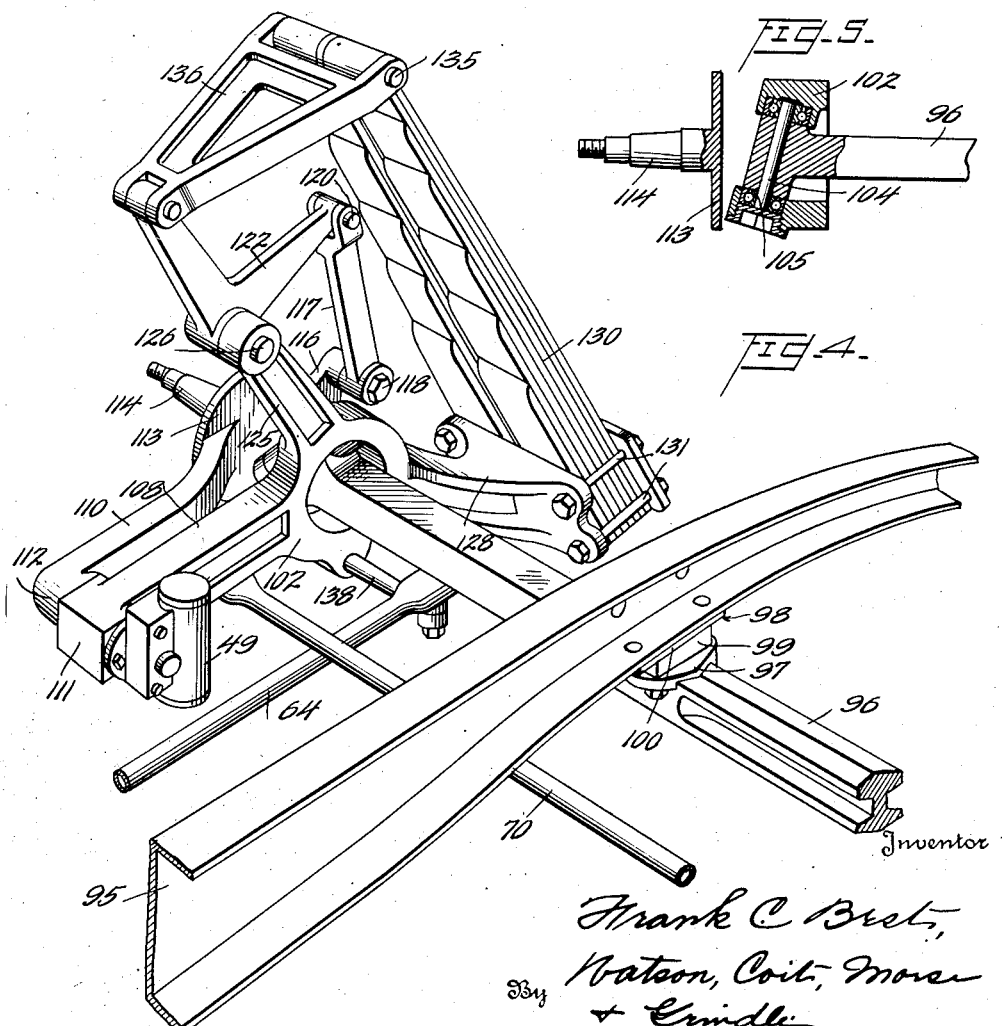

Patented Feb. 8, 1938

2,107,593

UNITED STATES PATENT OFFICE 2,107,593

MOTOR VEHICLE

Frank C. Best, Detroit, Mich., assignor to Packard Motor Car Company, Detroit, Mich., a corporation of Michigan Original application March 6, 1933, Serial No. 659,879. Divided and this application May 8, 1936, Serial No. 78,710

4 Claims. (Cl. 280—153)

This invention relates to motor vehicles and more particularly to wheel fairing arrangements employed in connection therewith.

The present application is a division of my prior application for Letters Patent for improvements in motor vehicles, Serial No. 659,879, filed March 6, 1933.

The general object of the invention is the provision of a novel and improved wheel fairing of the type described.

More specifically, it is an object of my invention to provide a wheel fairing which is designed to reduce the wind resistance of the wheel and its associated parts, and which is adapted to cooperate with the vehicle body panels or fenders for this purpose.

In its preferred embodiment, the invention contemplates the provision of a fairing applied to one of the steerable wheels of a motor vehicle and which is adapted to partake of the pivotal movements of the wheel as it is angled by means of the steering gear. In this embodiment, the fairing is secured to and supported by the steering knuckle or certain of its associated parts and, in its swinging movements during turning of the vehicle, it is designed to cooperate with the adjacent edges of the body panel, fender, or other running gear enclosing member, to maintain a proper closure between the fairing and such member to preserve the smooth streamlined contour of the vehicle.

Furthermore, in the illustrated embodiment, the wheel fairing is associated with a wheel which is provided with an independent wheel suspension, and while mounted to turn with the wheel, it does not follow the movements of the latter in its vertical oscillations when travelling on irregular surfaces, but rather conforms in this respect to the movement of the chassis or underframe of the vehicle.

Other objects and features of novelty will be apparent from the following specification when read in connection with the accompanying drawings in which one embodiment of my invention is illustrated by way of example.

In the drawings:

Figure 1 is a plan view of a portion of a motor vehicle chassis illustrating one embodiment of the present invention; the wheel fairings and parts of the chassis enclosing portions of the body panels or fenders being shown in section;

Figure 2 is a side elevation of the wheel supporting and steering mechanism illustrated in Figure 1;

Figure 3 is a side elevation of the forward end of the vehicle showing the relation, in this particular embodiment, of the fairing and a covering panel with which it is associated;

Figure 4 is a perspective view of the wheel supporting and steering mechanism; and Figure 5 is a view in vertical section taken substantially on line 5—5 of Figure 2.

In the drawings the improved fairing is shown in connection with one type of independent wheel suspension with which it is well adapted to be employed. However, its use is not limited to this construction, but it may be employed in other arrangements without departing from the spirit of the invention as set forth in the subjoined claims.

In the illustrated embodiment the side frame members on which the vehicle body is supported are indicated at 95, the axle 96 constituting a structural member serving to tie the side frame members together. Connection between the side frame members 95 and the axle 96 may be effected by securing these members rigidly together at either side of the vehicle, but alternatively a yielding or deformable means may be interposed between the axle and the side frame members to permit slight relative movement thereof. For instance, a plate 97 may be rigidly secured to the axle 96 and a supporting bracket 98 may be secured to the frame, a block 99 of rubber or other imperfectly elastic material being interposed between the plate 97 and the base portion 100 of the bracket 98, and being secured to both in any convenient manner, for instance by vulcanization. This construction not only serves to deaden shocks which would otherwise be transmitted from the axle to the frame, but is a compromise between the three point suspension and a four point suspension, preventing to some extent the transmission of forces from the axle to the frame which would result in twisting or weaving of the latter and at the same time ensuring reasonable stability of the frame on the axle.

Each end of the axle 96 affords a support for a member 102 which may be conveniently referred to as a steering knuckle. The knuckle 102 preferably surrounds the axle and is supported for rotation on a king pin 104, the latter passing through the axle and being secured therein as indicated at 105.

The steering knuckle 102 is formed with a rearwardly extending arm 108 terminating in a boss or bearing portion 111, and an arm 110 which serves to support the road wheel assembly and which in effect forms a part of the latter is pivotally connected to the boss 111 for swinging movement with respect thereto in a substantially vertical plane. For instance, the arm 110 may be provided at its rearward end with a spindle 112 journalled in the boss 111 and extending therethrough for cooperation with shock absorbing means within the casing 49 which may be constructed in any conventional manner, the shock absorber acting between the arms 108 and 110 to resist sudden vertical movement of the latter.

The forward end of the arm 110 merges into a plate 113 which carries a wheel spindle 114 on which the vehicle wheel 141 may be rotatably mounted.

Formed on or secured to the forward portion of the plate 113 is a lug 116, a link 117 being pivotally connected to this lug as indicated at 118 and being pivotally connected at 120 to one arm of a bell crank lever 122. The steering knuckle 102 is provided with an upwardly directed arm 125 on which the bell crank lever 122 is pivotally mounted as indicated at 126.

The steering knuckle 102 is further provided with a forwardly directed arm 128, to the outer face of which is secured a leaf spring assembly 130, the spring being retained in position on the arm by bolts 131.

It will be seen from the drawings that the leaf spring lies in a substantially vertical plane extending normally longitudinally of the vehicle, and at its outer end this spring is pivotally connected as indicated at 135 to a link 136, the other end of the link being connected as at 137 to the remaining arm of the bell crank lever 122.

A steering arm 138 is secured to the steering knuckle 102 and is pivotally connected to a drag link 64 which is connected to the manually operable steering mechanism in the conventional manner, for instance as pointed out in my copending application Ser. No. 659,879, of which this is a division. The arm 138 is of course provided only on that steering knuckle 102 which is at the left or steering side of the vehicle, the construction at the right hand side of the vehicle being otherwise identical. The steering knuckles 102 at opposite sides of the vehicle are connected for simultaneous movement by means of a cross tie rod 70, this rod being pivotally secured to any convenient portion of the knuckle, for instance to the underside of the rearwardly extending arm 108 as indicated at 138.

It will be observed that the leaf spring assembly 130 is carried by the steering knuckle and moves therewith during steering movements. By reason of the fact that the knuckle is supported on the vehicle frame, all of the elements of the steering gear may be supported on the frame and will partake of no relative movement in response to vertical movement of the road wheels on encountering an obstruction. When such vertical movement occurs, the road wheel assembly swings upwardly, thus rocking the bell crank lever 122 about its pivotal axis 126 and flexing the spring 130. The only force which can be applied to the leaf spring 130 is that which tends to flex it in the plane in which it lies, any twisting or lateral stress being eliminated, with the result that the life of the spring is appreciably extended.

By reason of the fact that the steering knuckle partakes of no vertical movement with respect to the vehicle frame, it is possible to provide a wheel fairing carried by the knuckle and movable therewith during steering movement of the latter for deflecting air currents from the wheels and associated parts to decrease the wind resistance. In performing this function, the fairing is arranged to cooperate with the covering structure which encloses the chassis or running gear of the vehicle and which may comprise a depending portion of a body panel or a fender. Thus the fairing may comprise an apron 140 extending generally parallel with the outer face of the road wheel 141 and directed inwardly fore and aft of the road wheel as indicated at 142. This apron may extend downwardly to an extent sufficient to form in effect a continuation of the lowest portion of the vehicle body panel or fender 144 and may extend slightly within the latter member. By forming the inwardly directed portions 142 of the apron 140 as arcs described about the axis of the steering knuckle, these portions may readily clear the edges of the panel 144 as the knuckle is swung for steering the vehicle and will provide an efficient closure for the space within the panels at all times.

The apron 140 may be conveniently secured to the knuckle at the forward and rear portions of the latter, for instance a supporting bracket 146 may be clamped on the leaf spring assembly by means of the bolts 131 between the spring and the plate 132, and a supporting bracket 147 may be bolted or otherwise rigidly secured to the rear face of the boss 111, the brackets 146 and 147 being secured to portions of the apron 140 as indicated at 148 and 149 respectively.

The panel 144 may be extended in the form of an apron 150 across the front of the vehicle and by the combined action of the panel 144 and the apron 140, excellent streamlining can be secured.

The numerous advantages and benefits attending the use of the independent wheel suspension which has been described are fully set forth in my copending application to which reference has been made. Furthermore, since the entire wheel assembly including the spring suspension constitutes in effect a relatively compact unit supported on the end of the axle, the assembly and servicing of the parts are greatly facilitated. It will also be seen that with the present arrangement standard width between wheels and between side frame members can be employed without reduction of the maximum angle to which the wheels can be turned for steering purposes.

In addition to these features making for the enhancement of the easy riding and steering qualities of the vehicle, the provision of the wheel fairing which has been described, adds greatly to the appearance and efficient operation of the vehicle in preserving the continuous streamline contour of the body thereof. By making the fairing movable with the wheel in the horizontal plane and shaping it to continually maintain the small limited clearance with the enclosing panel, a very effective continuous closure is provided at this point.

It is to be understood that various changes and modifications may be made in the embodiment illustrated and described herein without departing from the scope of the invention as defined by the following claims.

Having thus described the invention, what is claimed as new and desired to be secured by Letters Patent is:

1. In a motor vehicle, the combination with a vehicle frame, of road wheels disposed at opposite sides of said frame, independent suspension means supporting said wheels on said frame for steering movement and for independent rising and falling movement with respect thereto, fenders carried by said frame, said fenders affording covers for the upper periphery of said wheels and having lateral openings therein to permit angular displacement of said wheels for steering thereof, and wheel covers carried by said suspension means, said covers being so constructed and arranged as to fit within said apertures and to afford continuations of the adjacent lateral surfaces of the fenders, each cover being provided with an inwardly directed peripheral flange.

2. In a motor vehicle, the combination with a vehicle frame, of a steerable road wheel, a steering knuckle carried by said frame, wheel suspension means carried by said steering knuckle and supporting said road wheel for independent vertical movement in response to irregular road conditions, a body panel carried by said frame and partly surrounding said wheel, said panel having an opening at the side of said wheel to permit angular displacement of the latter for steering, and a wheel fairing carried by said knuckle, whereby said fairing is adapted to follow the steering movements of said wheel, but not to partake of said vertical movement thereof, said fairing being constructed and arranged across said opening so as to afford a continuation of the adjacent surfaces of said panel.

3. In a motor vehicle, the combination with a vehicle frame, of road wheels disposed at opposite sides of said frame, independent suspension means supporting said wheels on said frame for steering movement about a generally upright axis and for independent rising and falling movement with respect to said frame, fenders carried by said frame, said fenders affording covers for the upper peripheral portion of each wheel, each fender being formed to provide a lateral opening to permit angular displacement of said wheel for steering, and a wheel cover carried by said suspension means for steering movement only with each of said wheels, each of said covers being adapted to fit in the associated opening so as to complete the surface of said fender and being provided with an inwardly directed peripheral flange at least partially overlying the periphery of said wheel in the straight-ahead position of the latter.

4. In a motor vehicle, the combination with a vehicle frame, of road wheels disposed at opposite sides of said frame, independent suspension means supporting said wheels on said frame for steering movement and for independent rising and falling movement with respect thereto, fenders carried by said frame, said fenders affording covers for the upper periphery of said wheels and having lateral openings therein to permit angular displacement of said wheels for steering thereof, and wheel covers so supported by said suspension means as to follow steering movements of the wheels but not to partake of rising and falling movement therewith, said covers being so constructed and arranged as to fit within said apertures and to afford continuations of the adjacent lateral surfaces of the fenders.

FRANK C. BEST.